(12) United States Patent
Reynolds

(10) Patent No.: US 7,773,945 B2
(45) Date of Patent: Aug. 10, 2010

(54) RFID READER FRONT END

(75) Inventor: Matthew Stephen Reynolds, Medford, MA (US)

(73) Assignee: Thingmagic, Inc., Cambridge, MA (US)

( * ) Notice: Subject to any disclaimer, the term of this patent is extended or adjusted under 35 U.S.C. 154(b) by 761 days.

(21) Appl. No.: 11/167,401

(22) Filed: Jun. 27, 2005

(65) Prior Publication Data

US 2006/0293018 A1 Dec. 28, 2006

(51) Int. Cl.
H04B 7/00 (2006.01)

(52) U.S. Cl. ............... 455/41.3; 455/41.2; 455/324; 375/328

(58) Field of Classification Search ............... 455/231, 455/324, 41.2, 41.3, 230, 280, 161.1, 161.2; 375/328, 349
See application file for complete search history.

(56) References Cited

U.S. PATENT DOCUMENTS

| | | | |
|---|---|---|---|
| 4,210,910 A | 7/1980 | Wohlers | |
| 4,924,210 A | 5/1990 | Matsui et al. | |
| 5,425,032 A | 6/1995 | Shloss et al. | |
| 5,537,398 A | 7/1996 | Siwiak | |
| 5,604,486 A | 2/1997 | Lauro et al. | |
| 5,990,820 A * | 11/1999 | Tan | 341/161 |
| 6,172,609 B1 | 1/2001 | Lu et al. | |
| 6,334,051 B1 * | 12/2001 | Tsurumi et al. | 455/324 |
| 6,492,933 B1 | 12/2002 | McEwan | |
| 6,509,828 B2 | 1/2003 | Bolavage et al. | |
| 6,529,488 B1 | 3/2003 | Urs et al. | |
| 6,617,962 B1 | 9/2003 | Horwitz et al. | |
| 6,674,327 B2 * | 1/2004 | Harberts | 330/254 |
| 6,735,426 B1 | 5/2004 | Pau | |
| 6,812,824 B1 | 11/2004 | Goldinger et al. | |
| 7,002,505 B2 * | 2/2006 | Hughes | 341/161 |
| 7,075,412 B1 | 7/2006 | Reynolds et al. | |
| 7,227,449 B2 * | 6/2007 | Bonneau et al. | 340/10.41 |
| 2003/0104848 A1 | 6/2003 | Brideglall | |
| 2004/0022204 A1 | 2/2004 | Trembley | |
| 2004/0190092 A1 | 9/2004 | Silverbrook et al. | |
| 2005/0286660 A1 * | 12/2005 | Nysen et al. | 375/343 |
| 2006/0023813 A1 * | 2/2006 | Jaffe et al. | 375/327 |

(Continued)

OTHER PUBLICATIONS

International Preliminary Report on Patentability, PCT/US2006/023180, mailed on Jan. 17, 2008.

(Continued)

Primary Examiner—Edward Urban
Assistant Examiner—Christian A Hannon
(74) Attorney, Agent, or Firm—Choate Hall & Stewart LLP; John D. Lanza

(57) ABSTRACT

An RFID reader analog front end architecture employs multiplexed use of a single analog to digital converter in order to digitize the inphase and quadrature components of the incoming signal from the reader's receiving antenna. The Type 1 architecture includes an analog I/Q switch that controls which of the baseband signals will be digitized by a single Analog to Digital Converter. In the Type 2 architecture, the I/Q switch is moved so that it is directly adjacent to the receive mixers, requiring only one antialiasing filter block and gain block. In the Type 3 architecture, one mixer and its associated filtering chain are eliminated. The Type 4 architecture provides for selection of transmitter phase basis by means of an I/Q switch operating under control of the DSP that phase-shifts the transmitter with respect to the receiver.

14 Claims, 6 Drawing Sheets

U.S. PATENT DOCUMENTS

2006/0186995 A1* 8/2006 Wu et al. .................. 340/10.1

OTHER PUBLICATIONS

International Search Report, PCT/US2006/023180, mailed on May 15, 2007.

Written Opinion of the International Searching Authority, PCT/US2006/023180, mailed on May 15, 2007.

Notice of allowance for U.S. Appl. No. 10/448,053 dated Mar. 14, 2006.

* cited by examiner

RFID READER FRONT END

FIELD OF THE INVENTION

This invention relates to digital receiver circuit architectures and, in particular, to an RFID reader front end utilizing only one analog to digital converter.

BACKGROUND

Radio frequency identification (RFID) tags are rapidly replacing bar codes as the technology of choice for inventory tracking and appear to be the coming technology for retail checkouts as well. Among other functions, RFID readers receive RF signals from the RFID tags, and convert the received signals to digital signals for further processing for use in such applications as inventory tracking and pricing systems. This function is typically performed by the reader front end, which comprises the circuitry necessary for transmitting and receiving the RF signals and performing the analog to digital conversion prior to digital signal processing.

FIG. 1 depicts a prior art analog inphase/quadrature (I/Q) demodulator-based homodyne receiver circuit. The analog version of this homodyne circuit dates back at least to the 1950s (see, e.g., King, *Microwave Homodyne Systems* (1978)). As seen in FIG. 1, this architecture includes two receiver mixers 105, 110, operating simultaneously on an inphase local oscillator (LO) signal, from demodulator input port 115 through optional low noise amplifier (LNA) 120 and then O-degree splitter 125, and a quadrature LO signal, from LO input port 130 through quadrature hybrid 135. The inphase (I) and quadrature (Q) outputs of the receiver mixers are then passed through antialiasing filters 140, 145 and baseband amplifiers 150, 155 prior to signal processing.

The digital version of this homodyne receiver circuit, which is utilized in RFID reader front ends in current RFID industry standard practice, is depicted in FIG. 2. Like the circuit of FIG. 1, this architecture includes two receiver mixers 205, 210, operating simultaneously on an inphase LO signal, from demodulator input port 215 through optional LNA 220 and then 0-degree splitter 225, and a quadrature LO signal, from LO input port 230 through quadrature hybrid 235. The inphase (I) and quadrature (Q) outputs of the receiver mixers are then filtered 240, 245 and baseband amplified 250, 255 prior to further processing. This circuit further includes two analog to digital converters (ADCs) 260, 265 that independently and simultaneously convert the I and Q analog baseband outputs of the receiver mixers 205, 210 to a complex-valued digital representation for subsequent processing in the digital domain, e.g. by a Digital Signal Processor (DSP).

A problem with these prior art architectures is that ADCs can be very expensive, frequently representing 10-15% of the analog component cost in an RFID reader. Furthermore, in an integrated RFID reader based on an application specific integrated circuit (ASIC), the need for two ADCs to separately digitize I and Q components translates directly into increased development time and required semiconductor die area, which consequently leads to increased integrated circuit cost. Reducing the number of ADCs required for the reader front end would therefore translate directly into a large cost savings. What has been needed, therefore, is an RFID reader front end that uses only one analog to digital converter, rather than the current standard of two, in order reduce component and/or development costs.

SUMMARY

The present invention is a low cost architecture for RFID reader analog front ends. The invention employs multiplexed use of a single analog to digital converter (ADC) in order to digitize the inphase and quadrature components of the incoming signal from the reader's receiving antenna. The present invention can be divided into four variants, Types 1 through 4, each of which has particular advantages and disadvantages.

The Type 1 architecture differs from the prior art architecture in that it includes an analog I/Q switch that controls which of the baseband signals (either I or Q) will be digitized by a single Analog to Digital Converter, rather than the simultaneous I and Q sampling used in the prior art. In the Type 1 architecture, there are two methods by which the DSP can control the operation of the I/Q Switch. In the Type 1a subvariant, the DSP leaves the I/Q switch set in a particular position (either I or Q) for an entire tag transaction. In the Type 1b subvariant, the analog to digital converter operates at a sampling rate of 2Fs (versus the sampling frequency Fs of Type 1a). The I/Q switch then operates at a rate of Fs and the analog to digital converter therefore alternately samples I and Q on an every-other-sample basis. The DSP is then responsible for demultiplexing this stream of interleaved I and Q samples received from the ADC. The I and Q samples are thus taken at a fixed time offset of ½Fs with respect to each other. The DSP can easily compensate for this in software with a modified Hilbert transform operation.

In the Type 2 architecture, the I/Q switch is moved so that it is directly adjacent to the receive mixers. This reduces circuit complexity over the Type 1 implementation, in that the Type 2 variant has only one antialiasing filter block and gain block, whereas Type 1 has two. This architecture may be employed in either Type 2a or Type 2b subvariants, analogous to the Type 1a and 1b subvariants. In the Type 3 architecture, one mixer and its associated filtering chain are eliminated. Type 3 may also be broken down into Type 3a and 3b subvariants, in a manner analogous to the subvariants of Types 1 and 2.

The Type 4 variant differs from Types 1, 2, and 3 in that there is a transmitter-side improvement over the prior art. The Type 4 architecture includes a provision for selecting transmitter phase basis by means of an I/Q switch operating under control of the DSP. In this method, a switch is added to the RFID reader's transmitter LO signal that phase-shifts the transmitter with respect to the receiver. Thus, if the transmitter uses I/Q modulation and the receiver uses I/Q demodulation, the transmitter's orthogonal complex basis functions are shifted by a variable angle with respect to the receiver's orthogonal complex basis functions. With this arrangement, the RFID reader's DSP can improve the signal to noise ratio of the desired tag-response signal by minimizing the effect of unwanted transmitter antenna to receiver antenna coupling. Type 4 may also be broken down into Type 4a and 4b subvariants, in a manner analogous to the subvariants of Types 1, 2, and 3.

DETAILED DESCRIPTION

The present invention is a low cost architecture for RFID reader analog front ends (AFEs). The invention employs multiplexed use of a single analog to digital converter (ADC) in order to digitize the inphase and quadrature components of the incoming signal from the reader's receiving antenna.

In particular, the circuit architectures disclosed here can be used to build RFID readers that are less complex, physically smaller, easier to manufacture, and lower cost than existing alternatives. Since ADCs are expensive, reducing the number of ADCs required translates into a cost savings. The present invention also consumes less power than alternatives, and may be more suitable for integration into a reader ASIC. In some cases, a single ADC operating at a higher rate may be less expensive on a per-sample-per-second basis than two ADCs operating at a lower rate. In such a case, equivalent performance to the prior art architecture may therefore be obtained at a reduced cost. Furthermore, in an integrated RFID reader solution based on an application specific integrated circuit (ASIC), needing only one ADC to digitize I and Q components translates into decreased development time and semiconductor die area, and therefore decreased IC cost.

Figure 1:
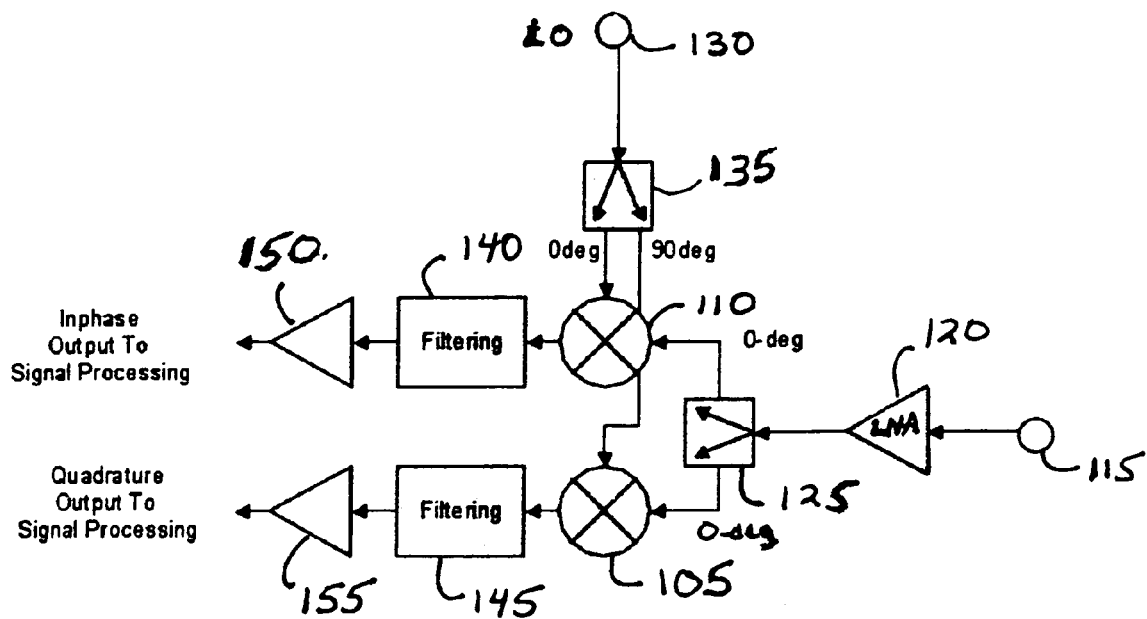
FIG. 1 depicts a prior art analog I/Q demodulator-based homodyne receiver circuit.
Figure 2:
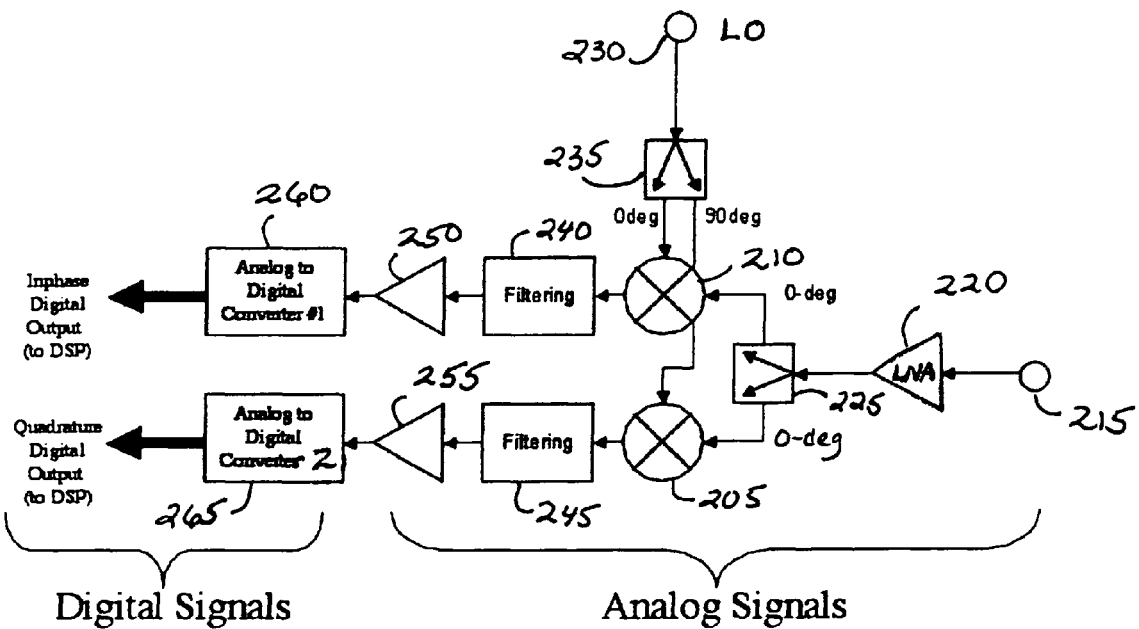
FIG. 2 depicts a prior art digital homodyne receiver circuit.
Figure 3:
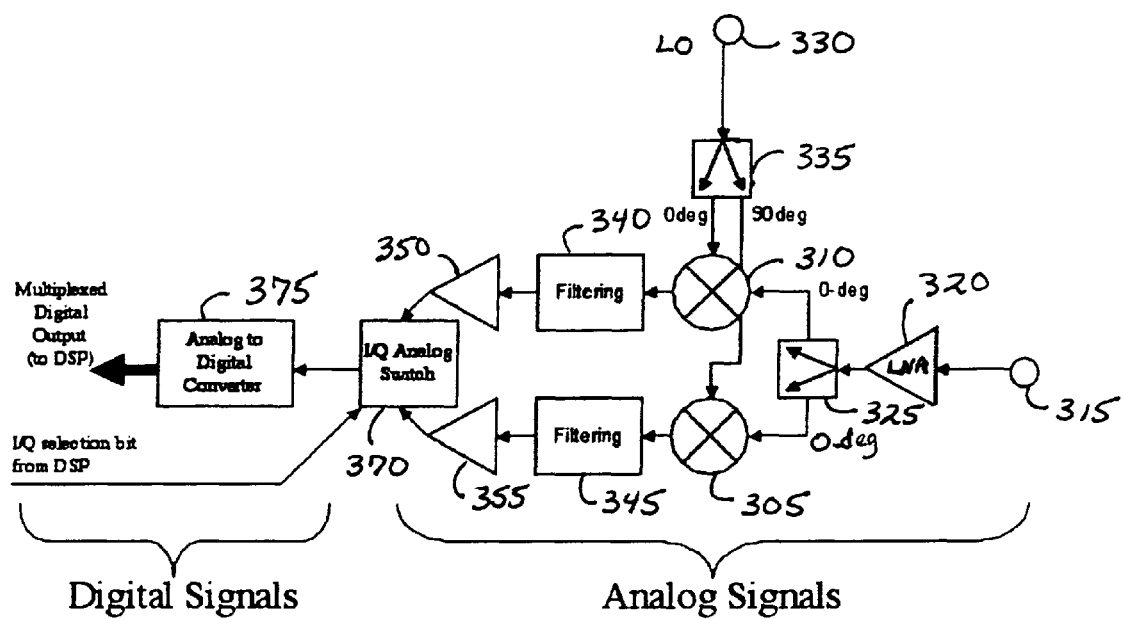
FIG. 3 depicts an embodiment of an RFID reader receiver circuit having only one analog to digital converter according to the present invention.

For description purposes, the present invention can be divided into four variants, Types 1 through 4, each of which has particular advantages and disadvantages over the prior art and the other variants. The Type 1 architecture is depicted in FIG. 3. It differs from the prior art architecture in that it includes an analog I/Q switch that controls which of the baseband signals (either I or Q) will be digitized by a single Analog to Digital Converter, rather than the simultaneous I and Q sampling used in the dual ADC system of FIG. 2. The Type 1a subvariant of this architecture has been extensively experimentally validated and is presently employed in the Mercury4e embedded RFID reader available from ThingMagic of Cambridge, Mass.

As shown in FIG. 3, the Type 1 architecture includes two receiver mixers 305, 310, operating simultaneously on an inphase LO signal, from demodulator input port 315 through optional LNA 320 and then O-degree splitter 325, and a quadrature LO signal, from LO input port 330 through quadrature hybrid 335. The inphase (I) and quadrature (Q) outputs of the receiver mixers are then filtered 340, 345 and baseband amplified 350, 355 prior to further processing. The circuit of the Type 1 variant further includes analog I/Q switch 370 that controls which of the baseband signals (either I or Q) is digitized by the single Analog to Digital Converter 375.

In the Type 1 architecture, there are two methods by which the DSP can control the operation of the I/Q Switch. In the first method, hereafter called Type 1a, the DSP leaves the I/Q switch set in a particular position (either I or Q) for an entire tag transaction. In the Type 1a subvariant, the DSP applies the following basic methodology:

(1) Set the I/Q switch to a particular state (I or Q).
(2) Transmit a command to the RFID tag(s).
(3) Sample the complete received tag response at nominal sample rate Fs, either in I or in Q as per the switch setting, for the entire duration of the expected tag response.
(4) Attempt to decode the sampled data; if this data decodes correctly as determined by a CRC calculation or other means, report success and return with the decoded data.
(5) If the received response does not decode correctly, set the I/Q switch to the opposite state, re-transmit the same command to the tag(s), sample the received response with the other LO phase at the same nominal sample rate Fs, attempt to decode, etc.
(6) If neither the I-sampled receive signal nor the Q-sampled receive signal decodes properly, report a decode failure and move on.

The Type 1a subvariant has the advantage of simplicity of operation and understanding. It samples I and Q signals incoherently—the I and Q samples that are taken from adjacent sampling runs cannot be combined without sophisticated means, such as an adaptive quadrature correlator, or a principal components analysis-based demodulator, to determine the unknown time and phase offset between the I and Q signals. Recombining the I and Q signals from a Type 1a system is particularly complicated because the LO signal is not perfectly stable over time, and the I and Q sample sets are sampled at widely-separated different times, which introduces' phase and frequency discontinuity between the I and Q sample sets. Without recombination of I and Q, the Type 1a method may be as much as 6 dB less sensitive than the prior art method. This is because, in the worst case, half of the tag's returned signal power would fall in to the opposite signal phase and would therefore not be considered in a given decoder run, resulting in a 3 dB loss of signal power. Another 3 dB loss then occurs in the power splitter that divides the incoming receiver signal into two paths for the I and Q mixers.

The Type 1a subvariant is somewhat inefficient from a time efficiency perspective, since in the (frequent) event that the received signal cannot be decoded in a given state (either I or Q), a complete retransmission cycle is attempted. This greatly reduces the effective read rate of RFID tags in the common case where some tags have energy primarily in either the I or Q bin (e.g., the tag's returned signal phase does not align to the same orthogonal basis as the reader's receiver). Since the tag's returned signal orthogonal basis angle (with regard to the reader's LO) is dependent on the electrical phase offset between the reader's LO and the tag's returned signal, and is therefore dependent on physical distances and cable lengths throughout the reader-cables-antenna-tag system, this introduces a geometry dependent time inefficiency into the reader system.

One optimization that can be applied to the Type 1a subvariant described above takes advantage of the fact that the reader will frequently perform many transaction cycles with a particular tag. This is especially true for composite (multi-command) operations, such as EPC Global Class 1 Generation 1 write operations. In this optimization, the I/Q switch state is preserved at the state that yielded success on the last transaction, rather than being reset to either I or Q on every transaction. Thus, if the tag-reader system is not moving, the time efficiency of operations will be no different than the prior art approach.

The second subvariant, Type 1b, compensates for this problem by switching the I/Q switch in a different way. In the Type 1b subvariant, the analog to digital converter operates at a sampling rate of 2Fs (versus the sampling frequency Fs of Type 1a). The I/Q switch then operates at a rate of Fs and the analog to digital converter therefore alternately samples I and Q on an every-other-sample basis. The DSP is then responsible for demultiplexing this stream of interleaved I and Q samples received from the ADC. The I and Q samples are thus taken at a fixed time offset of ½Fs with respect to each other. The DSP can easily compensate for this in software with a modified Hilbert transform operation. Since an analog to digital converter that operates at 2Fs usually costs less than two ADCs that each operate at Fs, this architecture has a significant cost and complexity advantage over the prior art architectures, while not reducing receiver sensitivity or time efficiency over the methods of the prior art.

Figure 4:
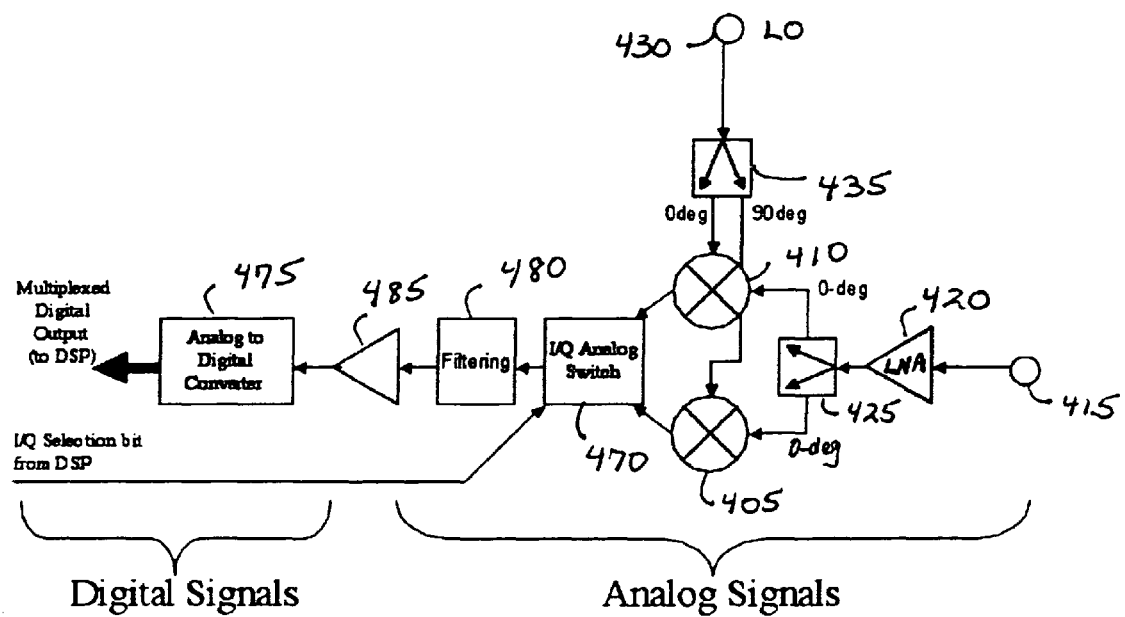
FIG. 4 depicts an alternate embodiment of an RFID reader receiver circuit, having only one analog to digital converter, one antialiasing filter, and one baseband amplifier according to the present invention.

In the Type 2 architecture, shown in FIG. 4, the I/Q switch is moved so that it is directly adjacent to the receive mixers. This reduces circuit complexity over the Type 1 implementation, in that the Type 2 variant has only one antialiasing filter block and gain block, whereas Type 1 has two. This architecture may be employed in either Type 2a or Type 2b subvariants, analogous to the Type 1a and 1b subvariants.

As shown in FIG. 4, the Type 2 architecture includes two receiver mixers 405, 410, operating simultaneously on an inphase LO signal, from demodulator input port 415 through optional LNA 420 and then through 0-degree splitter 425, and a quadrature LO signal, from LO input port 430 through quadrature hybrid 435. The inphase (I) and quadrature (Q) outputs of the receiver mixers are then passed directly to analog I/Q switch 470 that controls which of the baseband signals (either I or Q) is digitized by the single Analog to Digital Converter, through antialiasing filter 480 and baseband amplified 485, and finally to single Analog to Digital Converter 475.

The Type 2a subvariant operates analogously to the Type 1a subvariant, with no additional tradeoffs or inefficiencies. Since the I/Q switch operates slowly, at the tag transaction rate, there are none of the filtering difficulties associated with the Type 2b subvariant. The Type 2b subvariant introduces a subtle problem. Since the I/Q switch now operates at a rate of 2Fs, while from the perspective of either I or Q component signals the effective sampling rate is only Fs, a problem arises in designing a simple antialiasing filter block. This is because the filter block is subject to two conflicting constraints:

(1) The filter block must act as an antialiasing filter for the sampled I (or Q) signals at a rate of Fs. The Nyquist criterion suggests that signals with a frequency greater than Fs/2 must be rejected in this filter in order to avoid aliasing—thus indicating that the filter block must be a low pass filter with a cutoff frequency not exceeding Fs/2.

(2) Because the I/Q switch appears before the filter block, the filter must have an impulse response time sufficient to pass the switched I/Q signal at a rate of 2Fs.

These two criteria are impossible to satisfy in an analog, continuous time filter, since conditions (1) and (2) violate the linear, time invariant (LTI) principle of continuous time filtering. This is because an LTI filter would "smear" the I and Q samples together into an average, sampled voltage, which is not desirable since it is necessary to keep I and Q separate and orthogonal. However, a more complex filter based on a switched capacitor or another sampling topology is able to simultaneously satisfy these criteria. This filter also accepts the I/Q Selection Bit from the DSP as an input, and the filter maintains separate state variables for I and Q. Such a sampled filter requires an antialiasing filter ahead of it that has a cutoff frequency of Fs. The filtering problem renders the Type 2b subvariant of less practical import than the Type 1 or Type 2a architectures because, depending on the cost and complexity of the filter required for the Type 2b implementation, the cost advantages over a Type 1 implementation may be negated by the increased filter cost.

Figure 5:
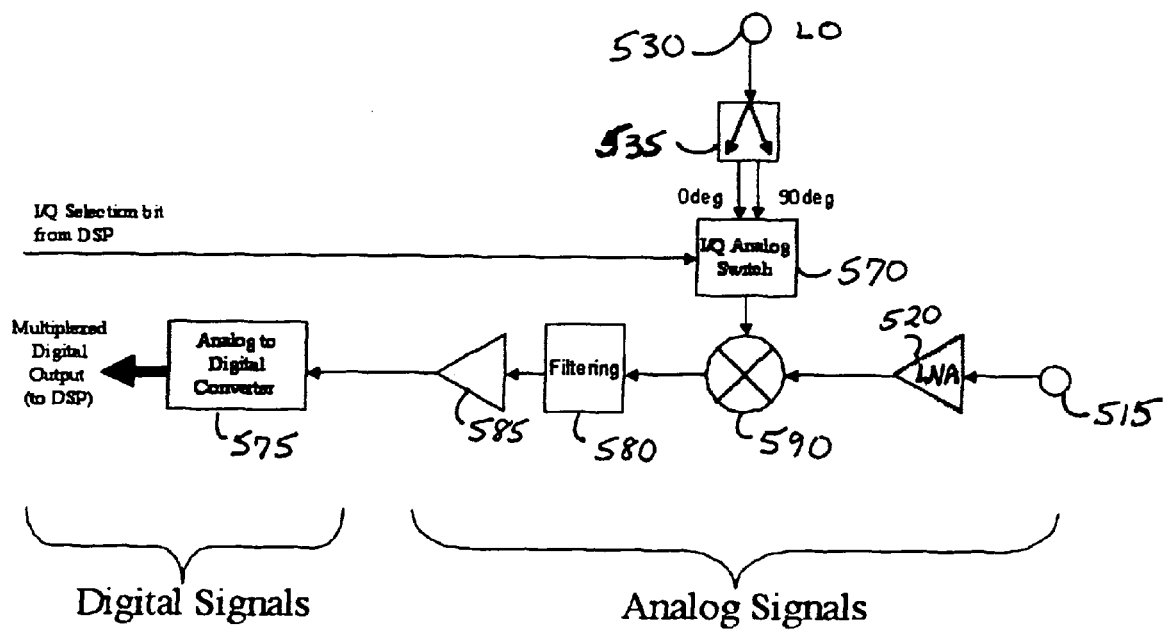
FIG. 5 depicts an alternate embodiment of an RFID reader receiver circuit, having only one analog to digital converter, one antialiasing filter, one baseband amplifier and only one mixer according to the present invention.

In the Type 3 architecture, shown in FIG. 5, advantage is taken of the fact that it is easy and inexpensive to build high-speed analog switches with bandwidths up to the incoming signal frequency. These switches are typically FET switches implemented in silicon, silicon germanium, or gallium arsenide process technologies. In Type 3, one mixer and its associated filtering chain are eliminated. Type 3 may be broken down into Type 3a and 3b subvariants, in a manner analogous to the subvariants of Types 1 and 2.

As shown in FIG. 5, the Type 3 architecture has a single receiver mixer 590, operating simultaneously on an inphase LO signal, from demodulator input port 515 through optional LNA 520 and a quadrature LO signal, from LO input port 530 through quadrature hybrid 535 and single analog I/Q switch 570. The output of receiver mixer 590 is then passed through antialiasing filter 580 and baseband amplifier 585, and finally to single Analog to Digital Converter 575 prior to further processing.

The Type 3a architecture has a major advantage over the Type 1a or Type 2a architectures. Because it does not split the incoming signal from the tag response into two paths and waste one path at any given time, a Type 3a system is 3 dB more sensitive than the Type 1a and Type 2a architectures. The Type 3a architecture has no significant drawbacks over the Type 1a or 2a architectures, so it is generally to be preferred for its simplicity over these architectures. The Type 3b subvariant has a problem similar to that of the Type 2b subvariant, in that the filtering requirements are difficult to satisfy. Without the design of a relatively complicated filter, the Type 3b subvariant is less useful than the Type 1b subvariant. However, if an appropriate filter for the Type 2b architecture is designed, then it is equally useful for the Type 3b subvariant, which therefore has the cost and complexity edge.

Figure 6:
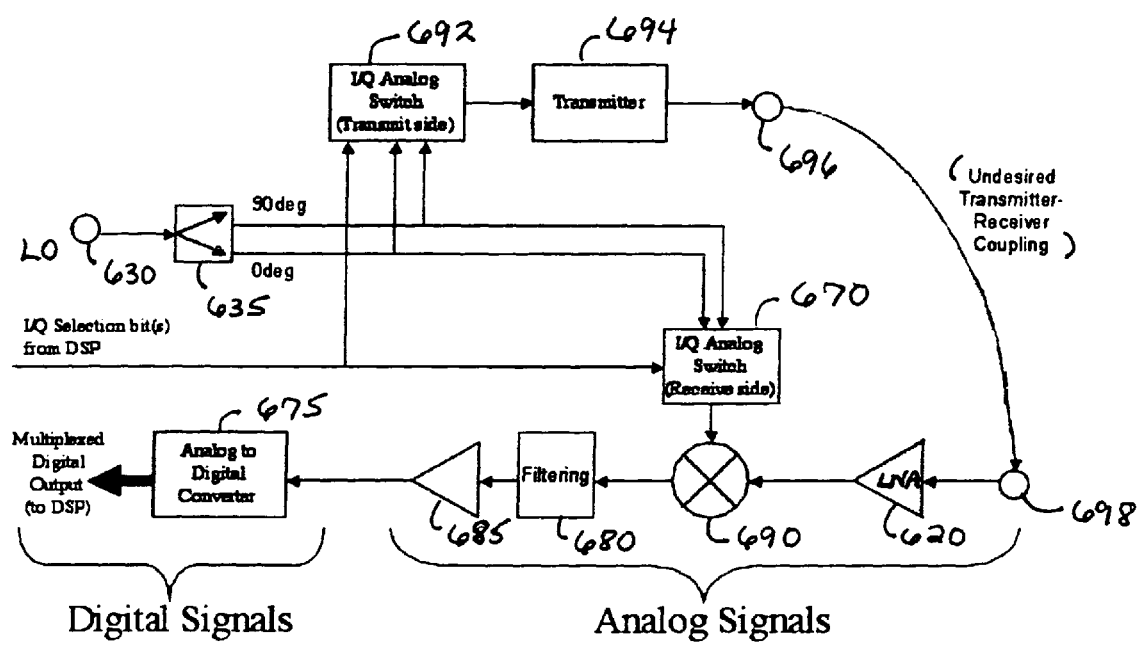
FIG. 6 depicts an alternate embodiment of an RFID reader receiver circuit, having only one analog to digital converter and configured to eliminate undesirable transmitter-receiver coupling according to the present invention.

The Type 4 variant, shown in FIG. 6, differs from Types 1, 2, and 3 in that there is a transmitter-side improvement over the prior art. In contrast to a typical prior art RFID reader, whose transmitter signal is generated directly from the local oscillator signal without control of transmitted signal phase basis angle, the Type 4 architecture includes a provision for selecting transmitter phase basis by means of an I/Q switch operating under control of the DSP. In this method, a switch is added to the RFID reader's transmitter LO signal that phase-shifts the transmitter with respect to the receiver. Thus, if the transmitter uses I/Q modulation and the receiver uses I/Q demodulation, the transmitter's orthogonal complex basis functions are shifted by a variable angle with respect to the receiver's orthogonal complex basis functions. With this arrangement, the RFID reader's DSP can improve the signal to noise ratio of the desired tag-response signal by minimizing the effect of unwanted transmitter antenna to receiver antenna coupling.

As shown in FIG. 6, the Type 4 architecture has a single receiver mixer 690, operating on a quadrature LO signal, from LO input port 630 through quadrature hybrid 635 and analog I/Q switch 670, under control of the DSP, and the phase-shifted LO signal, from receiver antenna port 698 through optional LNA 620. The output of receiver mixer 690 is then passed through antialiasing filter 680 and baseband amplifier 685, and finally to single Analog to Digital Converter 675 prior to further processing by a DSP. The phase-shifted LO signal is generated from the LO quadrature signal by passing the outputs of quadrature hybrid 635 through transmitter side I/Q analog switch 692, under control of the DSP, through transmitter 694 and then transmitter antenna port 696 to be received at receiver antenna port 698. After reception at receiver antenna port 698, the phase-shifted LO signal may be optionally filtered.

The Type 4 architecture solves one major problem of the prior art and the Type 1, 2, and 3 architectures. In those systems, undesirable transmitter-receiver coupling results from imperfect isolation between the transmitter and receiver signal paths. This may occur either inside the reader chassis, between antenna elements in a bistatic antenna configuration, in a circulator in a monostatic antenna configuration, or in the air if a reflective object is brought in front of the transmitting and receiving antennas. This undesirable transmitter-receiver coupling results in transmitted composite noise (mainly phase noise from the transmitter Local Oscillator signal), reducing the effective signal to noise ratio of backscattered tag responses.

The Type 4 architecture solves this problem by adding a phase shifting I/Q switch to the transmitter section, such that the unwanted transmitter noise can be switched into the temporarily-unused receiver channel. For example, when receiving on the Q channel, the transmitter can be switched to transmit with a phase that minimizes noise on the Q channel by moving that transmitter noise in phase with the I channel. Then, when receiving on the I channel, the transmitter noise can be moved to be in phase with the Q channel. This applies only to the Type 4a subvariant. The Type 4a architecture may therefore may have very significant receiver signal to noise advantages over the prior art and in other architectures where receiver signal to noise ratio is limited by the transmitter composite noise coupled into the receiver.

The Type 4b subvariant does have some practical disadvantages, stemming from the fact that switching the transmitted signal phase at a regular interval can result in an unwanted phase modulation (PM) component on the transmitted signal. While this signal can, in theory, be filtered out both by the tag and by the reader's receiver, it presents a regulatory compliance problem from the point of view of the FCC's Part 15 rules.

It should be appreciated that the Type 4 architecture is not limited to a discrete, binary phase offset adjustment between the transmitter and the receiver. A variable phase offset, such as that introduced by a phase shifter operating under either analog or digital control, may be introduced in place of the transmitter phase adjustment switch. This variable phase offset introduces a finer vernier trim of phase between transmitter and receiver.

The method and apparatus described in this application can be used to build lower cost RFID readers than are possible with the reader front end circuits found in the prior art. Additionally, certain of these circuits are more power-efficient and better suited for integration into an ASIC implementation than are the circuits of prior art. The variety of Types of architectures described herein also allow more exact tradeoffs between cost, complexity, and performance than the systems of prior art, and therefore may have business model advantages as well, since different customer applications and price points may be supported by different reader front end architectures.

The apparatus and method of the present invention therefore provide an RFID reader front end that uses only one analog to digital converter, in order reduce component and/or development costs. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications and substitutions by one of ordinary skill in the art are therefore also considered to be within the scope of the present invention, which is not to be limited except by the claims that follow.

The invention claimed is:

1. A digital receiver circuit for a radio-frequency identification (RFID) tag reader comprising:
   an analog receiver circuit receiving an RFID tag response to a transmitted command, the analog receiver circuit producing an inphase RFID tag response signal and a quadrature RFID tag response signal from the RFID tag response and having a first analog switch for selecting one of the inphase and quadrature signals for digitizing, wherein the first analog switch receives the inphase and quadrature signals from a quadrature hybrid and provides the inphase and quadrature signals to a single receiver mixer;
   a single analog-to-digital converter connected via the first analog switch to the analog receiver circuit for digitizing the selected one of the inphase RFID tag response signal and the quadrature RFID tag response signal received from the analog receiver circuit;
   a digital signal processor for decoding digitized RFID tag response signals from the analog-to-digital converter, determining whether the digitized RFID tag response signals decode correctly and if the digitized RFID tag signals do not decode correctly with the analog switch in a first switch state, switching the analog switch from the first switch state to a second switch state; and
   a second analog switch for receiving the inphase and quadrature signals from the quadrature hybrid and controlling the provision of the signals via a transmitter to the receiver mixer.

2. The circuit of claim 1, wherein the first analog switch receives the inphase and quadrature signals from two receiver mixers.

3. The circuit of claim 2, wherein the signals received by the first analog switch are filtered and amplified before entering the first analog switch.

4. The circuit of claim 2, the analog receiver circuit further comprising a filter and an amplifier for filtering and amplifying the output of the first analog switch before the output is sent to the analog-to-digital converter.

5. A RFID reader front end system comprising:
   a transmitter for transmitting a command to an RFID tag;
   an analog receiver circuit receiving an RFID tag response to the transmitted command, the analog receiver circuit producing an inphase RFID tag response signal and a quadrature RFID tag response signal from the RFID tag response to the transmitted command and having a first analog switch for selecting one of the inphase and quadrature signals for digitizing, wherein the first analog switch receives the inphase and quadrature signals from a quadrature hybrid and provides them to a single receiver mixer;
   a single analog-to-digital converter connected via the first analog switch to the analog receiver circuit for digitizing the selected one of the inphase RFID tag response signal and the quadrature RFID tag response signal received from the analog receiver circuit; and
   a digital signal processor for decoding digitized RFID tag response signals from the analog-to-digital converter, determining whether the digitized RFID tag response signals decode correctly and if the digitized RFID tag signals do not decode correctly with the analog switch in a first switch state, switching the analog switch from the first switch state to a second switch state; and a second analog switch for receiving the inphase and quadrature signals from the quadrature hybrid and providing them via a transmitter to the receiver mixer, the second analog switch being under the control of the digital signal processor.

6. The system of claim 5, wherein the first analog switch receives the inphase and quadrature signals from two receiver mixers.

7. The circuit of claim 6, wherein the signals received by the first analog switch are filtered and amplified before entering the first analog switch.

8. The system of claim 6, the analog receiver circuit further comprising a filter and an amplifier for filtering and amplifying the output of the first analog switch.

9. A method for converting received RFID tag response signals to digital signals, comprising the steps of:

receiving, by an analog receiver circuit, an RFID tag response signal from an RFID tag;

producing an inphase RFID tag response signal and a quadrature RFID tag response signal from the received RFID tag response signal;

selecting, by an analog switch, one of the inphase RFID tag response signal and the quadrature RFID tag response signal for digitizing;

digitizing, by an analog-to-digital converter, the selected one of the inphase RFID tag response signal and the quadrature RFID tag response signal;

decoding the digitized RFID tag response signal;

determining whether the digitized RFID tag response signal decoded correctly; and if the digitized RFID tag signals do not decode correctly with the analog switch in a first switch state, switching the analog switch from the first switch state to a second switch state;

transmitting a command to the RFID tag;

receiving, by an analog receiver circuit, an RFID tag response to the transmitted command;

producing an inphase RFID tag response signal and a quadrature RFID tag response signal from the received RFID tag response to the transmitted command;

digitizing, by the analog-to-digital converter, one of the inphase RFID tag response signal and the quadrature RFID tag response signal selected with the analog switch in the second switch state;

decoding the digitized RFID tag response signal;

determining whether the digitized RFID tag response signal decodes correctly;

if the digitized RFID tag signal decodes correctly, sending the decoded data for further processing; and if the digitized RFID tag signal does not decode correctly, reporting a decode failure.

10. The method of claim 9, wherein the inphase and quadrature signals are provided to the first analog switch via two receiver mixers.

11. The method of claim 10, further comprising the step of filtering and amplifying the signals received by the first analog switch before they enter the first analog switch.

12. The method of claim 10, further comprising the step of filtering and amplifying the output of the first analog switch before it is sent to the analog-to-digital converter.

13. The method of claim 9, wherein the inphase and quadrature signals are provided to the first analog switch from a quadrature hybrid and further including the step of providing the selected signal from the first analog switch to a single receiver mixer before it is sent to the analog-to-digital converter.

14. The method of claim 13, further comprising the steps of:

providing a second analog switch for receiving the inphase and quadrature signals from the quadrature hybrid; and providing a selected one of the inphase and quadrature signals via a transmitter to the receiver mixer.

* * * * *